United States Patent [19]
Wilkinson

[11] Patent Number: 5,905,795
[45] Date of Patent: May 18, 1999

[54] TWO-LINE SUBSCRIBER SYSTEM

[75] Inventor: Philip A. Wilkinson, Dallas, Tex.

[73] Assignee: Alcatel USA Sourcing, L.P., Plano, Tex.

[21] Appl. No.: 08/845,610

[22] Filed: Apr. 25, 1997

[51] Int. Cl.$^6$ .......................... H04M 11/00; H04M 1/00
[52] U.S. Cl. ................ 379/413; 379/102.04; 379/90.01
[58] Field of Search .................... 379/413, 167, 379/165, 212, 399, 102.04; 370/420, 421, 522, 536; 359/125, 117–119, 115, 167, 164, 90.07

[56] References Cited

U.S. PATENT DOCUMENTS

| | | | |
|---|---|---|---|
| 4,459,434 | 7/1984 | Benning et al. | 379/160 |
| 4,538,031 | 8/1985 | Benning et al. | 379/102.06 |
| 4,575,584 | 3/1986 | Smith et al. | 379/279 |
| 4,647,721 | 3/1987 | Busam et al. | 379/102.04 |
| 4,797,874 | 1/1989 | Chahabadi et al. | 370/221 |
| 4,853,949 | 8/1989 | Schorr et al. | 379/2 |
| 5,051,720 | 9/1991 | Kittirutsunetorn | 340/310.02 |
| 5,056,132 | 10/1991 | Coleman et al. | 379/93.11 |
| 5,216,704 | 6/1993 | Williams et al. | 379/93.08 |
| 5,392,023 | 2/1995 | D'Avello et al. | 358/400 |
| 5,818,819 | 10/1998 | Hallock et al. | 370/259 |

Primary Examiner—Reinhard J. Eisenzopf
Assistant Examiner—Charles N. Appiah
Attorney, Agent, or Firm—Baker & Botts, L.L.P.

[57] ABSTRACT

A two-line subscriber system (10) includes a remote channel unit (20) coupled to a central office (14) by a single telephone line (16). The remote channel unit (20) provides additional line capability to a customer premises (18) by allowing a first telecommunications unit (22) and a second telecommunications unit (24) to operate despite having only a single telephone line (16). The remote channel unit (20) operates from a local power source (26), such as a battery or customer premises alternating current, to provide operating power to the first telecommunications unit (22) and the second telecommunications unit (24). In response to a loss of the local power source (26), the remote channel unit (20) cuts a connection to the second telecommunications unit (24) and passes line power from the single telephone line (16) to the first telecommunications unit (22) for continued operation of the first telecommunications unit (22).

15 Claims, 1 Drawing Sheet

TWO-LINE SUBSCRIBER SYSTEM

TECHNICAL FIELD OF THE INVENTION

The present invention relates in general to telecommunications system configurations and signal processing and more particularly to a two-line subscriber system.

BACKGROUND OF THE INVENTION

Conventional two-line digital loop carrier devices are typically mounted on the exterior of a customer premises and operate off of line power supplied by the central office over the telephone line. The external installation of these devices requires that they provide suitable resistance to the environment for reliable operation. The weather-proofing of such devices is one of the major expenses during manufacture. Another major expense is the power adaptation circuitry required to handle the line power. Therefore, it is desirable to provide a two-line digital loop carrier device that avoids the environment and power expenses of conventional devices.

SUMMARY OF THE INVENTION

From the foregoing, it may be appreciated that a need has arisen for a two-line device that can operate within a customer premises and does not rely on central office line power. In accordance with the present invention, a two-line subscriber system is provided that substantially eliminates or reduces disadvantages and problems associated with conventional two-line digital loop carrier devices.

According to an embodiment of the present invention, there is provided a two-line subscriber system that includes a remote channel unit operable to receive telecommunications signals from a single telephone line.

The remote channel unit demultiplexes the telecommunications signals received over the single telephone line into a first set of telecommunications signals and a second set of telecommunications signals. The remote channel unit is coupled to a first telecommunications unit and provides the first set of telecommunications signals to the first telecommunications unit. The remote channel unit is coupled to a second telecommunications unit and provides the second set of telecommunications signals to the second telecommunications unit. The remote channel unit receives local power separate from the single telephone line and provides power to the first and second telecommunications units in response to the local power.

The present invention provides various technical advantages over conventional two-line digital loop carrier devices. For example, one technical advantage is to use local power separate from central office line power. Another technical advantage is to place the two-line device inside the customer premises. Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
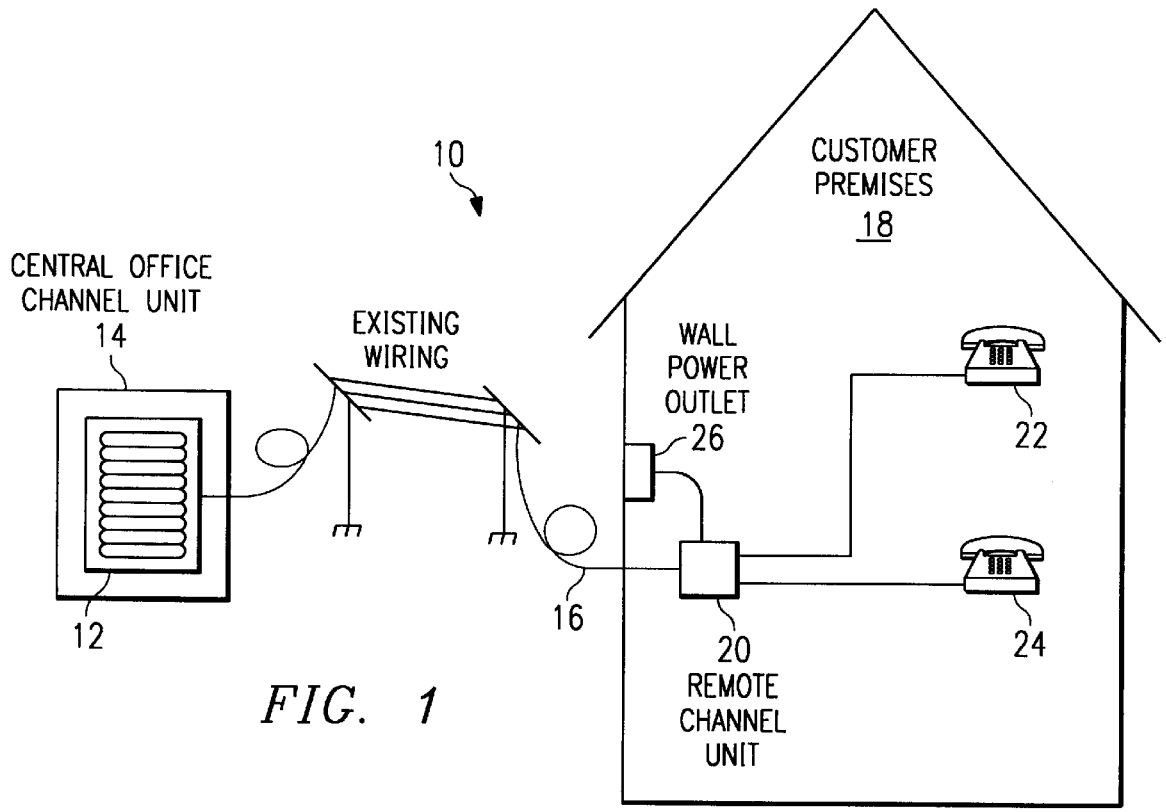
FIG. 1 is a block diagram of a two-line subscriber system.

FIG. 1 is a block diagram of a two-line subscriber system 10. Two-line subscriber system 10 communicates with a channel unit 12 located in a central office 14. Communication occurs over a communication link 16. Communication link 16 may be any variety of conventional links for carrying telecommunications signals. For example purposes, communication link 16 is a single telephone line twisted pair wire link between central office 14 and a customer premises 18. Communication link 16 couples to a remote channel unit 20 within customer premises 18. Remote channel 20 provides telecommunications capabilities between central office 14 and a first telecommunications unit 22 and a second telecommunications unit 24 over communication link 16. First telecommunications unit 22 and second telecommunications unit 24 may be a combination of telephone sets, computers, modems, facsimile machines, or any other device desiring receipt, transfer, and/or exchange of telecommunications traffic. A local power source 26 within customer premises 18 provides operating power for remote channel unit 20, first telecommunications unit 22, and second telecommunications unit 24. Local power source 26 may provide operating power through a battery source, wall outlet alternating current source supplied to customer premises 18, or any other conventional source of power.

In operation, two-line subscriber system 10 provides a quick, easy, and economical technique to give subscribers at customer premises 18 additional lines without adding new cable. Additional bandwidth is made available to the subscriber using the same communication link 16 already laid to customer premises 18. The digital subscriber loop between central office 14 and customer premises 18 is split into two separate bearer channels, a first bearer channel for first telecommunications unit 22 and a second bearer channel for second telecommunications channel 24. Remote channel unit 20 provides the interfaces between communication link 16, local power source 26, first telecommunications unit 22, and second telecommunications unit 24. As telephone calls destined for customer premises 18 are received, remote channel unit separates the two bearer channels from each other for routing to first telecommunications unit 22 and second telecommunications unit 24, respectively. Remote channel unit 20 also terminates the central office power received over communication link 16 for later use in an event of a loss of power from local power source 18.

Figure 2:
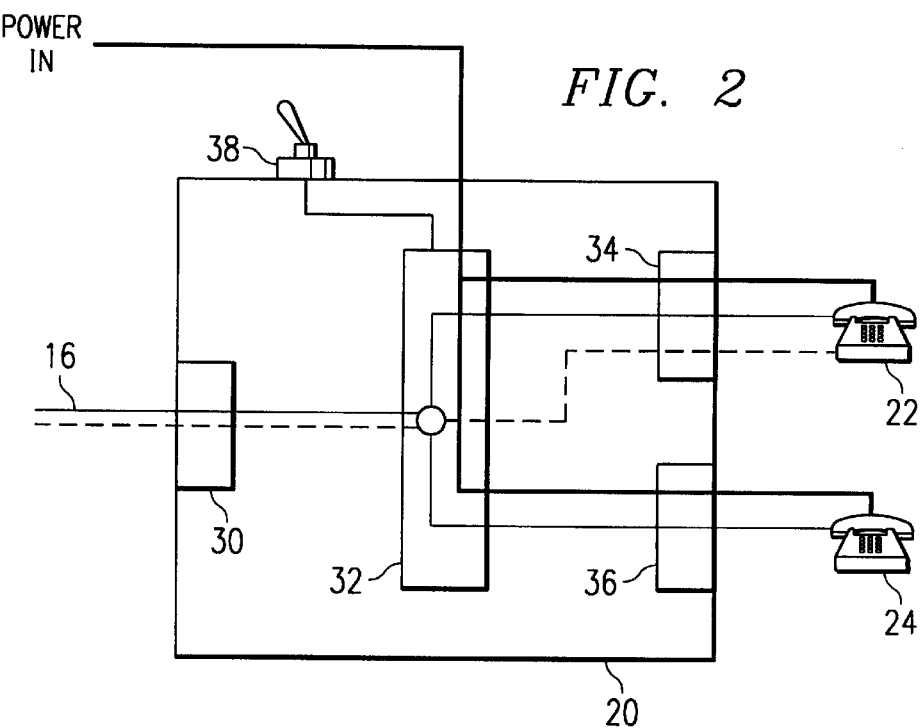
FIG. 2 is a block diagram of a remote channel unit of the two-line subscriber system.

FIG. 2 is a simplified block diagram of remote channel unit 20. Remote channel unit 20 includes a network line port 30 to receive telecommunication signals and central office power from communication link 16. Network line port 30 provides telecommunications signals and central office power to a power control unit 32. Power control unit 32 separates the first and second bearer channels from the telecommunications signals for transfer to a first local port 34 and a second local port 36. The first local port 34 provides the first bearer channel to the first telecommunications unit 22 and the second local port 36 provides the second bearer channel to the second telecommunications unit 24. Power control unit 32 also routes power from local power source 26 to drive first telecommunications unit 22 and second telecommunications unit 24.

In an event of detection of a loss of power from local power source 26, power control unit 32 disconnects local power from first telecommunications unit 22 and second telecommunications unit 24. Power control unit 32 routes the telecommunications signals provided by network line port 30 to first telecommunications unit 22. Power control unit 32 also transfers the central office power to first telecommunications unit 22 in order to provide continued telecommunications capability between central office 14 and customer premises 18. Remote channel unit 20 may also include a switch 38 that allows power control unit 32 to provide either two-line or single line telecommunications capability at customer premises 18. Switch 38 disconnects transfer of telecommunications signals to second telecommunications unit 24 and local power from first telecommunications unit 22 and second telecommunications unit 24. Switch 38 allows telecommunications signals and central office power to pass through to first telecommunications unit 22 for continued single line operation at customer premises 18.

In the customer premises 18 to central office 14 direction, power control unit 32 multiplexes the first bearer channel from first telecommunications unit 22 with the second bearer channel from second telecommunications unit 24 for transfer to central office 14 over communication link 16. In the event of a loss of local power, power control unit 32 passes the telecommunications signals from only first telecommunications unit 22 over communication link 16 to central office 14.

Thus, it is apparent that there has been provided, in accordance with the present invention, a two-line subscriber system that satisfies the advantages set forth above. Although the present invention has been described in detail, it should be understood that various changes, substitutions, and alterations readily ascertainable by those skilled in the art can be made herein without departing from the spirit and scope of the present invention as defined by the following claims.

What is claimed is:

1. A remote channel unit of a two-line subscriber system for use at a customer premises, comprising:
    a network line port operable to receive telecommunications signals from and provide telecommunications signals to a single telephone line, the telecommunications signals including a first set of telecommunications signals and a second set of telecommunications signals;
    a first local port operable to provide the first set of telecommunications signals received at the network line port over the single telephone line to a first telecommunications unit, the first local port operable to provide return telecommunications signals to the single telephone line through the network line port from the first telecommunications unit;
    a second local port operable to provide the second set of telecommunications signals received at the network line port over the single telephone line to a second telecommunications unit, the second local port operable to provide telecommunications signals to the single telephone line through the network line port from the second telecommunications unit;
    a power control unit operable to receive local power from the customer premises, the power control unit operable to provide power to the first telecommunications unit and the second telecommunications unit in response to the local power, the power control unit operable to provide communications over the single telephone line for both the first local port and the second local port, wherein the power control unit is operable to detect a loss of the local power, the power control unit operable to prevent transfer of the second set of telecommunications signals by the second local port in response to the loss of the local power.

2. The remote channel unit of claim 1, wherein the power control unit passes telephone power on the single telephone line through the first local port to the first telecommunications unit in response to the loss of the local power.

3. The remote channel unit of claim 1, wherein the power control unit includes a switch to selectively disable the second local port and prevent the power control unit from providing power to the second telecommunications unit.

4. The remote channel unit of claim 3, wherein the switch is operable to pass line power and the first set of telecommunications signals carried over the single telephone line to the first telecommunications unit regardless whether or not local power is present.

5. The remote channel unit of claim 1, wherein the first telecommunications unit is a telephone operable to receive and provide telecommunications signals.

6. The remote channel unit of claim 1, wherein the first telecommunications unit is a computer operable to receive and provide telecommunications signals.

7. The remote channel unit of claim 1, wherein the local power is supplied by a battery.

8. The remote channel unit of claim 1, wherein the local power is supplied by customer premises alternating current.

9. A two-line subscriber system, comprising:
    a remote channel unit operable to receive telecommunications signals from a single telephone line, the remote channel unit operable to demultiplex the telecommunications signals received over the single telephone line into a first set of telecommunications signals and a second set of telecommunications signals;
    a first telecommunications unit coupled to the remote channel unit, the remote channel unit operable to provide the first set of telecommunications signals to the first telecommunications unit;
    a second telecommunications unit coupled to the remote channel unit, the remote channel unit operable to provide the second set of telecommunications signals to the second telecommunications unit, the remote channel unit operable to receive local power separate from the single telephone line, the remote channel unit operable to provide power to the first and second telecommunications units in response to the local powers wherein the remote channel, unit is operable to detect a loss of the local power, the remote channel unit operable to disable transfer of the second set of telecommunications signals to the second telecommunications unit in response to the loss of the local power.

10. The two-line subscriber system of claim 9, wherein the remote channel unit is operable to pass through line power carried over the single telephone line to the first telecommunications unit in response to the loss of the local power, the first telecommunications unit operable to continuing operating on the line power upon the loss of the local power.

11. The two-line subscriber system of claim 9, wherein the local power is supplied by a battery.

12. The two-line subscriber system of claim 9, wherein the local power is supplied by local alternating current.

13. The two-line subscriber system of claim 9, wherein the first telecommunications unit is any one of the group consisting of a telephone, a computer, a facsimile machine, and a modem.

14. The two-line subscriber system of claim 9, wherein the remote channel unit includes a switch operable to disable transfer of the second set of telecommunications signal to the second telecommunications unit and disable power to the second telecommunications unit from the remote channel unit.

15. The two-line subscriber system of claim 14, wherein the switch is operable to disable power to the first telecommunications unit from the remote channel unit, the switch operable to pass through line power and the first set of telecommunications signals carried over the single telephone line to the first telecommunications unit in order to maintain operation of the first telecommunications unit regardless whether or not local power is present.

* * * * *